UNITED STATES PATENT OFFICE.

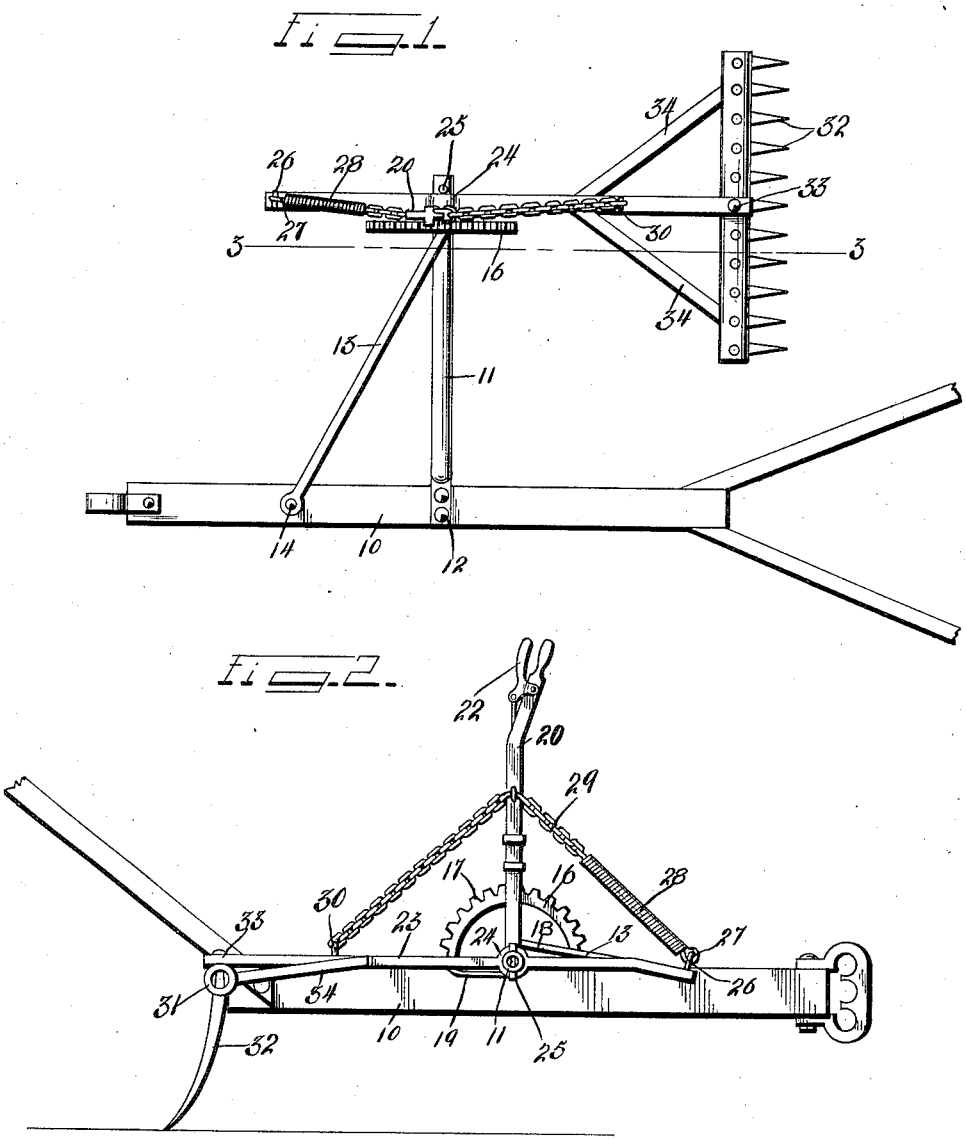

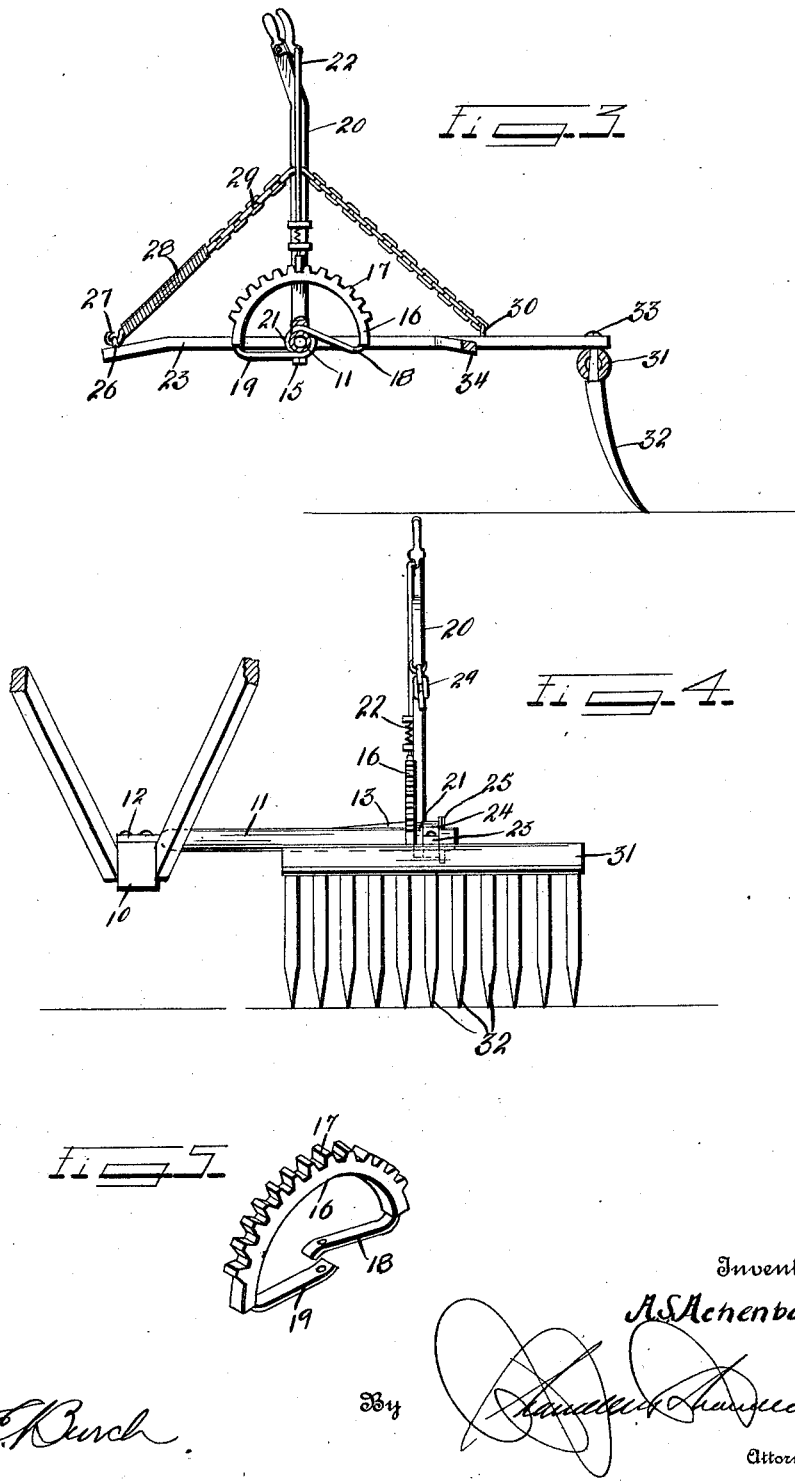

ALBERT S. ACHENBACH, OF WINNETOON, NEBRASKA.

HARROW ATTACHMENT FOR PLOWS.

1,030,700.   Specification of Letters Patent.   Patented June 25, 1912.

Application filed August 17, 1911. Serial No. 644,648.

*To all whom it may concern:*

Be it known that I, ALBERT S. ACHENBACH, a citizen of the United States, residing at Winnetoon, in the county of Knox, State of Nebraska, have invented certain new and useful Improvements in Harrow Attachments for Plows; and I do hereby declare the following to be a full, clear, and exact description of the invention, such as will enable others skilled in the art to which it appertains to make and use the same.

This invention relates to a harrow attachment for plows and more especially to a device adapted to be attached to the beam of a gang plow.

The principal object of the invention is to provide an improved harrow attachment for pulverizing and leveling a plowed surface, the device being constructed of a series of parts of novel formation, thereby rendering the device efficient in use and economical to manufacture.

Another object of the invention is to provide a supporting means of novel form for pivotally mounting a toothed bar and permitting its adjustment to engage or to be moved out of engagement with the ground and to resiliently hold it in contact with the ground when so engaged to automatically apply pressure to the bar and serve to efficiently break up lumps in the soil or to pass obstructions which would be liable to injure the teeth.

With the above and other objects in view the invention consists of certain other combinations and arrangements of parts as will be hereinafter more fully described and claimed, it being a still further object of the invention to provide a device which will not be likely to get out of working order.

In the drawings:—Figure 1 is a top plan view of a fragmentary portion of a plow with my improved harrow attachment connected thereto. Fig. 2 is a side elevation thereof. Fig. 3 is a sectional view taken on the line 3—3 of Fig. 1. Fig. 4 is a rear elevation of the device. Fig. 5 is a detail view of a segmental rack plate employed with the device.

Referring to the drawings in detail, there is shown a plow beam 10 of a gang plow of ordinary construction to which my improved attachment is secured, the same comprising a circular bar 11 preferably tubular in form and having one end flattened as shown at 12 and bolted to the plow. A brace rod 13 of strap iron is secured at its inner end which is disposed forwardly as shown at 14 by bolting the same to the plow and said brace rod extends diagonally rearwardly and is attached to the tubular bar 11 by a bolt 15 and thus forms a draw bar for the harrow attachment.

A rack bar 16 having a series of teeth 17 in one edge portion thereof is formed of a section of strip metal bent in the form of a segment of a circle and has its end portions 18 and 19 of reduced diameter. The end portion 19 extends beneath the bar 11 while the end portion 18 extends over the bar 11 in overlapped relation with regard to the portion 19 and are secured by the bolt 15 simultaneously with the securing of the brace 13 to said bar 11. A lever 20 having a sleeve portion 21 at its lower end is provided with a spring latch member 22 to engage the teeth of the rack bar and said throw lever has its sleeve portion rotatably mounted upon the outer end portion of the rod 11 beyond the securing bolt 15 for a purpose to be hereinafter made apparent.

A longitudinal draft bar 23 is also mounted upon the bar 11 outwardly of the lever for pivotal movement through the medium of a bearing sleeve 24 which is displaceable and said parts are retained in position by a key 25 disposed through the bar 11 outwardly of the draft bar.

As will be clearly seen from the drawings, the draft bar 23 has its forward end directed downwardly and carries an eye 26 for detachable engagement with a hook 27 formed at one end of a coiled spring 28 and said spring has a chain connection 29 which is secured intermediate its ends to the lever adjacent its upper portion and is extended rearwardly and secured to the bar 23 adjacent its rear extremity as shown at 30. A toothed bar 31 having a series of properly spaced apart teeth 32 for pulverizing and leveling the soil, is secured centrally of its length to the rear end of the draft bar 23 as shown at 33 and is braced thereto by diagonal braces 34 connecting the bars, thereby rendering the structure rigid.

In the operation of the device, the attachment when secured to a plow is adapted to be drawn across the field with the plow and to operate upon the plowed surface and by reason of the connections of the lever with the draft bar, the toothed bar may be held disengaged from the ground when the lever is in a central position and the said lever can be held in a forward or rearward position to disengage or engage the teeth with the ground as desired and the spring serves to resiliently hold the teeth in contact with the ground to automatically apply pressure to the bar and serve to efficiently break up the lumps in the soil or pass obstructions which would be liable to injure the teeth. The device adds little additional draft and can be readily attached.

I claim:—

1. The combination with a plow; of a rod rigidly secured thereto at one side thereof, a draft bar pivotally mounted intermediate its ends upon the rod, a rack bar also mounted upon the rod, a lever coacting with said rack bar, a harrow device at the rear end of the draft bar and connections between the lever and the bar upon opposite sides of its pivot point, said lever being capable of adjustment through the medium of the rack bar.

2. A harrow attachment for plows comprising the combination with a plow beam; of a tubular bar rigidly secured thereto and extending laterally therefrom, a brace bar between the beam and tubular bar forwardly thereof, a rack bar formed of a section of strip metal having its end portions secured to the tubular bar in connection with the brace bar, a lever having a sleeve portion pivotally engaged upon the tubular bar and having a latch coacting with the rack bar, a draft bar similarly mounted intermediate its ends, a toothed bar carried by and braced to the draft bar, a spring detachably engaged with the forward end of the draft bar and a chain connected to the spring and rear portion of the draft bar and intermediately to the lever.

In testimony whereof, I affix my signature, in presence of two witnesses.

ALBERT S. ACHENBACH.

Witnesses:
P. P. GLIMSDEL,
GEO. W. SAUNDERS.

Copies of this patent may be obtained for five cents each, by addressing the "Commissioner of Patents, Washington, D. C."